US 8,058,322 B2

(12) United States Patent
Piotrowski et al.

(10) Patent No.: US 8,058,322 B2
(45) Date of Patent: Nov. 15, 2011

(54) FLAME-RETARDANT FLEXIBLE POLYURETHANE FOAM

(75) Inventors: Andrew M. Piotrowski, Yorktown Heights, NY (US); Sophia Dashevsky, Monroe Township, NJ (US); Sergei Levchik, Croton-On-Hudson, NY (US); Yingzhong Guo, Brooklyn, NY (US)

(73) Assignee: ICL-IP America Inc., Ardsley, NY (US)

( * ) Notice: Subject to any disclaimer, the term of this patent is extended or adjusted under 35 U.S.C. 154(b) by 280 days.

(21) Appl. No.: 11/921,095

(22) PCT Filed: May 30, 2006

(86) PCT No.: PCT/US2006/020785
§ 371 (c)(1),
(2), (4) Date: Apr. 17, 2009

(87) PCT Pub. No.: WO2007/001717
PCT Pub. Date: Jan. 4, 2007

(65) Prior Publication Data
US 2009/0281205 A1 Nov. 12, 2009

(51) Int. Cl.
*C08G 18/16* (2006.01)

(52) U.S. Cl. .......................... 521/108; 521/107; 521/170

(58) Field of Classification Search .................. 521/107, 521/108, 170
See application file for complete search history.

(56) References Cited

U.S. PATENT DOCUMENTS

| | | | |
|---|---|---|---|
| 3,737,397 A * | 6/1973 | Baranauckas et al. | 521/168 |
| 5,177,116 A * | 1/1993 | Genz et al. | 521/110 |
| 6,380,273 B1 | 4/2002 | Eilbracht et al. | |
| 2007/0112084 A1* | 5/2007 | Hansel et al. | 521/107 |
| 2008/0275152 A1* | 11/2008 | Hansel et al. | 521/163 |

FOREIGN PATENT DOCUMENTS

| | | |
|---|---|---|
| EP | 0316737 | 5/1989 |
| GB | 2319251 | 5/1998 |

* cited by examiner

*Primary Examiner* — John Cooney
(74) *Attorney, Agent, or Firm* — Dilworth & Barrese, LLP.

(57) ABSTRACT

A flexible polyurethane foam-forming composition and the flexible polyurethane foam obtained therefrom contain, as flame-retardant additive, a halogen-free phosphonate compound which is substantially unreactive for isocyanate, contains at least about 5 weight percent phosphorus, has an acid value of about 2 mg KOH/g or less, a volatility as measured by thermogravimetric analysis not exceeding a 5.0 percent weight loss at a temperature of about 150° C., and a weight average molecular weight of from about 200 to about 2000.

8 Claims, No Drawings

FLAME-RETARDANT FLEXIBLE POLYURETHANE FOAM

BACKGROUND OF THE INVENTION

This invention relates to a flame-retardant flexible polyurethane foam.

Flexible polyurethane foams are widely employed in such products as mattresses and seating where safety considerations require that they exhibit effective fire retardant properties. The typical flexible polyurethane foams of commerce do not inherently possess satisfactory resistance to ignition and/or flame propagation but can be made to do so by the addition of one or more flame retardant substances thereto, generally to the foam-forming compositions or to a component thereof before, or as, the foam-foaming reaction takes place.

Halogenous as well as non-halogenous phosphorus-based compounds are known for use as fire retardants in flexible polyurethane foams. Illustrative of such compounds and flexible polyurethane foams incorporating them in flame retardant-effective amounts are those disclosed in U.S. Pat. No. 4,623,672 (1-phosphonoethane-2-carboxylic acid-tri-$C_1$-$C_4$ alkyl esters); U.S. Pat. No. 4,656,200 (amine salts of phosphonic acids); U.S. Pat. No. 4,666,967 (salt formed by reaction between dimethyl methyl phosphonate, monomethyl methyl phosphonate or methyl phosphonic acid and an organonitrogen compound such as urea, dicyandiamide, guanidine, aminoguanidine, thiourea, N-methyl urea, N-allyl urea, N,N'-diallyl urea, N,N'-dimethyl urea, ethylene urea, biurea, (thio) acetamide, (thio) propionamide, (thio) butyramide, (thio) octanamide, malonamide, mono- or di-thio malonamide, succinamide, mono- or di-thio succinamide, sebacamide, pyrrolidone, piperidinone, (thio) caprolactam and (thio) dodecalactam); U.S. Pat. No. 5,276,066 (1,3,2-dioxaphosphorinan)amines); U.S. Pat. No. 6,262,135 (blend of monomeric halogenated organic flame retardant, e.g., a halogenated phosphate ester such as tris(dichloropropyl)phosphate, tris(2-chloroethyl)phosphate, tris(dibromopropyl) phosphate, tris(bromo-chloropropyl)phosphate, and the like, and an oligomeric organophosphate, e.g., the reaction product of a polyphosphate ester (obtained by the reaction of phosphorus pentoxide and a trialkyl phosphate such as triethylphosphate) with an epoxide such as ethylene oxide); U.S. Pat. No. 6,380,273 (hydroxyalkylphosphonates); and, U.S. Pat. No. 6,861,452 (a halogen-free phosphate ester that possesses at least one alcoholic hydroxyl group, has an acid value of 2 mg KOH/g or less, a viscosity f 5 Pa·S or less at 25° C., a hydroxyl value of 5 to 250 KOH mg/g, and a weight average molecular weight of 200 to 2000); DE 3803030 (phosphonate obtained by the transesterification of dimethyl methyl phosphonate with a diol or diphenol in the presence of sodium methylate); DE 19853025 (mixture of dimethyl-1-hydroxyethane phosphonate and diethyl ethyl phosphonate or diphenylcresyl phosphate); EPA 0 245 207 (salts of dimethyl methyl phosphonate); EPA 0 908 464 (dimethyl-1-hydroxymethane phosphonate); and, UK Patent Application GB 2 319 251 (halogen-free, oligomeric or polymeric, alkylene-bridged alkyl phosphonates).

BRIEF DESCRIPTION OF THE INVENTION

In accordance with the present invention, there is provided a flexible polyurethane foam-forming composition which, under polyurethane foam-forming conditions, provides a flame-retardant flexible polyurethane foam, the composition comprising:
a) at least one polyol;
b) at least one polyisocyanate;
c) at least one blowing agent;
d) at least one catalyst for the polyurethane foam-forming reaction;
e) at least one halogen-free flame retardant phosphonate compound which is substantially unreactive for isocyanate, contains at least about 5 weight percent phosphorus, has an acid value of about 2 mg KOH/g or less, a volatility as measured by thermogravimetric analysis not exceeding a 5.0 percent weight loss at a temperature of about 150° C. and a weight average molecular weight of from about 200 to about 2000; and,
f) optionally, one or more other components.

Further in accordance with the present invention, there is provided a flexible polyurethane foam-forming composition which, under polyurethane foam-forming conditions, provides a flame retardant flexible polyurethane foam, the composition comprising:
a) at least one polyol;
b) at least one polyisocyanate;
c) at least one blowing agent;
d) at least one catalyst for the polyurethane-forming reaction;
e) at least one halogen-free flame retardant phosphonate compound of the general formula

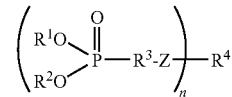

wherein $R^1$ and $R^2$ each independently is a hydrocarbyl group of from 2 to about 8 carbon atoms or are joined together with their respective oxygen atoms and the phosphorus atom to form a heterocyclic ring having at least 5 ring members; $R^3$ is a divalent alkylene group of up to about 8 carbon atoms, Z is —O—, —S— or —C($X^1$) $X^2$— wherein $X^1$ and $X^2$ each independently is O or S; $R^4$ is a hydrocarbon residue of up to about 8 carbon atoms having a valence equal to n and n is an integer of 1 to 4, provided, when Z is —C(O)O—, n is 2 to 4; and,
f) optionally, one or more other components.

DETAILED DESCRIPTION OF THE INVENTION

Individual components (a)-(f) of the polyurethane foam-forming composition of the invention will now be described.

(a) Polyol

Examples of polyols which can be used include those commonly used in the production of flexible polyurethane foams such as polyether polyols, polyester polyols and polymer polyols.

Examples of polyether polyols include those with a hydroxyl value of from about 25 to about 70 KOHmg/g which are obtained by the random or block addition of alkylene oxides such as ethylene oxide and propylene oxide to polyfunctional polyols, amine compounds, and the like. Examples of polyfunctional polyols include glycols such as ethylene glycol and propylene glycol; triols such as glycerol and trimethylolpropane; polyols such as pentaerytliritol, sorbitol and sucrose. Examples of amine compounds include ammonia, triethanolamine, ethylene diamine, diethylene triamine, aminoethyl piperazine and aniline.

Polyester polyols are compounds having terminal hydroxyl groups obtained by the polycondensation of polyfunctional carboxylic acids and polyfunctional hydroxyl compounds or the ring-opening self-condensation polymerizations of a lactone. The polyester polyols preferably have a number average molecular weight of from about 500 to about 10,000, and more preferably from about 1000 to about 5000. Examples of polyfunctional carboxylic acids include adipic acid, phthalic acid, succinic acid, azelaic acid and sebacic acid. Examples of polyfunctional hydroxy compounds include glycols such as ethylene glycol, propylene glycol, butanediol and diethylene glycol, and polyhydric alcohols such as glycerol, trimethylol propane and pentaerythritol. Examples of lactones include gamma-butyrolactone and epsilon-caprolactone.

Polymer polyols can be obtained by mixing a polyether polyol and an ethylenically unsaturated monomer, and, when necessary, adding chain transfer agents, dispersion stabilizers, and the like, to bring about the radical polymerization of the ethylenically unsaturated monomer in the presence of a radical initiator. Examples of ethylenically unsaturated monomers include monomers containing the cyano group such as acrylonitrile and methacrylonitrile; (meth)acrylic esters such as methyl (meth)acrylate, butyl (meth)acrylate, stearyl (meth)acrylate, hydroxyethyl (meth)acrylate, dimethylaminoethyl (meth)acrylate and dimethylaminopropyl (meth)acrylate; monomers containing carboxyl group such as acrylic acid, methacrylic acid, itaconic acid, maleic acid and fumaric acid; acid anhydride monomers such as maleic anhydride and itaconic anhydride; hydrocarbon compounds such as butadiene, isoprene and 1,4-pentadiene; aromatic hydrocarbon compounds such as styrene, alpha-methyl styrene, phenylstyrene and chlorostyrene; halogen-containing monomers such as vinyl chloride and vinylidene chloride; vinyl ethers such as vinyl ethyl ether and vinyl butyl ether; vinyl ketones such as vinyl ethyl ketone; vinyl esters such as vinyl acetate; acrylamides such as acrylamide, N,N-dimethylacrylamide, N-isopropylamide, N,N-dimethylaminopropyl acrylamide and methylene bisacrylamide; and methacrylamides such as N,N-dimethyl methacrylamide. Such ethylenically unsaturated monomers can be used alone or in combinations of two or more.

The aforementioned polyol components can be used alone or in combinations of two or more depending on the properties required of the flexible polyurethane foam that is to be prepared.

For example, a flexible polyurethane foam with high elasticity can be obtained when the aforementioned polyether polyol and polymer polyol are used in a proportion, based on the combined weight of the two, of from about 30 to about 90 weight percent of the former and from about 70 to about 10 weight percent of the latter, and preferably from about 40 to about 80 weight percent of the former and from about 60 to about 20 weight percent of the latter.

(b) Polyisocyanate

Examples of polyisocyanates which can be used include those having two or more isocyanate groups which have heretofore been used for making flexible polyurethane foams. Examples of such polyisocyanate compounds include aromatic polyisocyanates, aliphatic polyisocyanates and alicyclic polyisocyanates, as well as mixtures of two or more of such polyisocyanates, and modified polyisocyanates obtained by the modification of such polyisocyanates. Specific examples of such polyisocyanates are tolylene diisocyanate, diphenylmethane diisocyanate, polymethylene polyphenylene polyisocyanate (crude MDI), xylylene diisocyanate, isophorone diisocyanate and hexamethylene diisocyanate; and modified products of such polyisocyanates, such as carbodiimide-modified products, biuret-modified products, dimers and trimers. Prepolymers with terminal isocyanate groups obtained from such polyisocyanates and active hydrogen-containing compounds can also be used.

(c) Blowing Agent

As the blowing agent in the flexible polyurethane foam-forming composition of the present invention, known blowing agents heretofore used in such compositions are suitably selected according to the properties required of the foamed product.

Water is a typical example of such a blowing agent; other examples include methylene chloride, n-butane, isobutane, n-pentane, isopentane, dimethyl ether, acetone, carbon dioxide, and the like. Depending on the desired density and other properties of the foamed polyurethane, these and other blowing agents can be used alone or in combinations of two or more in a manner known in the art.

The amount of blowing agent to be used is not particularly limited but will ordinarily range from about 0.1 to about 40 parts by weight per 100 parts by weight of the polyol component of the foam-forming composition.

(d) Catalyst

The flexible polyurethane foam-forming composition herein can contain any of the catalysts, and combination of catalysts, heretofore known or used for the production of polyurethane foams. Examples of useful catalysts include sodium hydroxide, sodium acetate, tertiary amines or materials which generate tertiary amines such as trimethylamine, triethylene diamine, N-methyl morpholine, N,N-dimethyl cyclohexylamine, and N,N-dimethyl aminoethanol. Also applicable are metal compounds such as hydrocarbon tin alkyl carboxylates, dibutyl tin diacetate, dibutyl tin dioctoate dibutyl tin dilaurate and stannous octoate; as well as other compounds intended to promote trimerization of the polyisocyanate such as, 2,4,6-tris(N,N-dimethylamino-methyl)phenol, 1,3,5-tris(N,N-dimethyl-3-aminopropyl)-S-hexahydrotriazine, potassium octoate, potassium acetate and catalysts such as DABCO TMR® and POLYCAT 43®.

Many other kinds of catalysts can be substituted for those listed above, if desired. The amount of catalyst used can advantageously range from about 0.05 to about 5 weight percent or more based on the total weight of polyol in the foam-forming mixture.

(e) Halogen-free Flame-Retardant Phosphonate Compound

The flame retardant component of the flexible polyurethane foam-forming composition herein is a halogen-free phosphonate compound which is substantially nonreactive for isocyanate, i.e., does not possess any active hydrogen-containing groups such as hydroxyl, mercapto, amino and carboxylic acid groups. The useful flame retardant phosphonates will contain at least about 5 weight percent phosphorus, preferably at least about 7 weight percent phosphorus and more preferably at least about 9 weight percent phosphorus, and will possess an acid value of about 2 mg KOH g or less and preferably about 1 mg KOH/g or less, a volatility as measured by thermogravimetric analysis (TGA) not exceeding 5.0 weight percent loss at a temperature of about 150° C., preferably at a temperature of about 170° C. and more preferably at a temperature of about 200° C., and a weight average molecular weight of from about 200 to 2000 and preferably from about 300 to about 1000.

Any phosphonate compound satisfying all of the aforestated characteristics can be employed as the flame retardant component of the flexible polyurethane foam-forming reaction composition of this invention.

Halogen-free phosphonate flame-retardant compounds that are useful herein include those of the general formula:

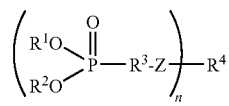

wherein $R^1$ and $R^2$ each independently is a hydrocarbyl group of from 2 to about 8 carbon atoms, preferably an alkyl, cycloalkyl, phenyl or alkyl-substituted phenyl group, or are joined together with their respective oxygen atoms and the phosphorus atom to form a heterocyclic ring having at least 5, and preferably 6, ring members, $R^3$ is a divalent hydrocarbylene group of up to about 8 carbon atoms, preferably a straight or branched chain alkylene group of from 2 to 4 carbon atoms in the main chain, Z is —O—, —S— or —C($X^1$) $X^2$— in which $X^1$ and $X^2$ each independently is O or S, and is preferably —O— or —C(O)O—; $R^4$ is a hydrocarbon residue of up to 8 carbon atoms, preferably from 2 to 4 carbon atoms, having a valence equal to n; and, n is an integer of 1 or 2 and is preferably from 2 to 4, provided, that when Z is —C(O)O—, n is 2 to 4.

Examples of useful halogen-free phosphonate flame retardant compounds include:

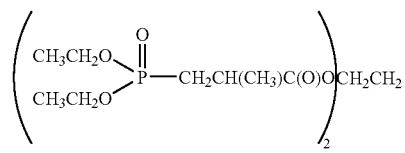

propionic acid, 2-methyl-3-phosphono-,1,1'-ethylene tetraethyl ester

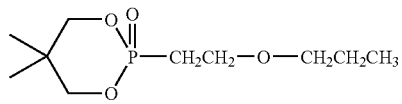

neopentylene 2-propoxy ethylphosphonate

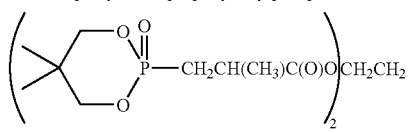

propionic acid, 2-methyl-3-phosphono-,1,1'-neopentylene ester

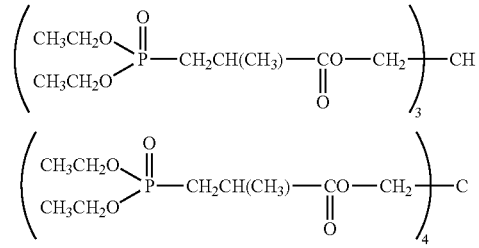

The phosphonate flame retardant will be incorporated in the flexible polyurethane foam-forming composition herein in amounts which will impart acceptable flame retardant characteristics to the foam formed therefrom. In general, these amounts can vary from about 2 to about 30, and preferably from about 6 to about 20, parts per 100 parts of total polyol component in the foam-forming composition.

If desired, the phosphonate flame retardant herein can be combined with one or more other flame retardant additives, preferably of the non-halogenated variety. Examples of such other flame retardants are phosphate esters such as triphenyl phosphate, alkylated aromatic phosphate esters such as cresyl phosphate or butylated or propylated phenyl phosphate, and the like, phosphate-phosphonate ester such as Antiblaze 19 (Rhodia) and halogenated phosphate esters such as SR-2 (trisdichloropropyl phosphate, Supresta). When utilized, these additional or auxiliary flame-retardants can be used in amounts representing up to about 80 weight percent, preferably not greater than 50 weight percent, of the entire flame retardant mixture.

(f) Optional Component(s)

In order to obtain relatively uniform distribution of the various components of the flexible polyurethane foam-forming composition and to achieve the desired formation of bubbles in the foamed polyurethane, an emulsifier and/or surfactant may be incorporated in therein. These materials are physical in their effect and are not always necessary, especially if denser foams are desired. Any of the many hundreds of conventional surfactants can be used in amounts of up to about 5 weight percent based on the weight of the total polyol component. Suitable surfactants are polydimethylsiloxane and polydimethylsiloxane polyalkylene copolymers, and the like.

It is also within the scope of the invention to incorporate one or more other optional components in the flexible polyurethane foam-forming composition where one desires to achieve a particular end result. Such components include, without limitation, adhesion promoters, antioxidants, antistatic agents, antimicrobials, dyes, heat stabilizers, light stabilizers, pigments, plasticizers, preservatives, ultraviolet stabilizers, and fillers in the customary amounts.

The following examples are illustrative of the invention.

COMPARATIVE EXAMPLE 1

Synthesis of Isocyanate-reactive Phosphonate Flame Retardant Compound CA

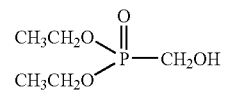

diethyl hydroxymethyl phosphonate

To a mixture of 138 g (1.0 mole) diethyl phosphite and 30 g (1.0 mole) paraformaldehyde, 5 ml (0.036 mole) triethylamine was added slowly at room temperature under nitrogen. In few seconds, the temperature of the mixture increased to 145° C. The reaction mixture was then allowed to cool to room temperature and Flame Retardant Compound CA was distilled under vacuum at 92° C./0.126 mmHg. The yield was 70%.

COMPARATIVE EXAMPLES 2-3

The following compounds were prepared following known synthetic methods, e.g., those disclosed in U.S. Pat. Nos. 2,612,513, 2,724,718 and 2,957,931, and in A. N. Pudovik et al., *Doklady Akad. SSSR*, 73, 327 (1951); *Chem. Abstr.*, 45, 2853 (1951):

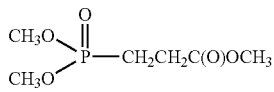

phosphonoethane-2-carboxylic acid-trimethyl ester:
Phosphonate Flame Retardant Compound CB

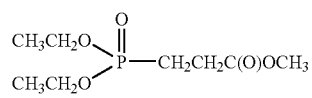

phosphonoethane-2-carboxylic acid-methyl diethyl ester:
Phosphonate Flame Retardant Compound CD

COMPARATIVE EXAMPLE 4

Synthesis of Phosphonate Flame Retardant Compound CE

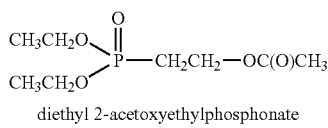

diethyl 2-acetoxyethylphosphonate

To a mixture of 190 g (1.38 moles) diethylphosphite and 8 g (0.045 moles) Trigonox 301 (Akzo Nobel), a mixture of 18 g (0.13 moles) of diethylphosphite, 17 g (0.098 moles) Trigonox 301 and 139.2 g (1.61 moles) of vinyl acetate was added dropwise at 125° C. over 1.5 hours. The reaction mixture was then maintained at 130° C. for 3 hours and following distillation under vacuum (60° C./150 millitorr), provided 262 g of Flame Retardant Compound CE. The yield was 78%.

Example 1

Synthesis of Phosphonate Flame Retardant Compound A

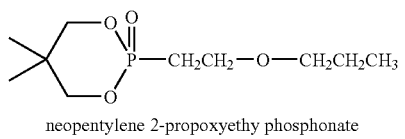

neopentylene 2-propoxyethy phosphonate 407 g (2.72 moles) neopentylphosphite was placed in a four-necked flask provided with stirrer, thermometer, addition funnel and condenser connected to a supply of nitrogen. A mixture of 235 g (2.73 moles) propyl vinyl ether and 27 g Trigonox 201 was added to the flask at 128° C. over 6 hours. Thereafter, the reaction was continued at 130° C. for 2 hours. Flame Retardant Compound A was distilled at 106° C./165 millitorr. The yield was 70%.

Example 2

Synthesis of Phosphonate Flame Retardant Compound B

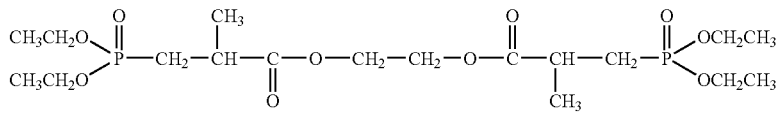

propionic acid, 2-methyl-3-phosphono-,1,1'-ethylene tetraethyl ester

To a mixture of 373 g (2.71 moles) diethylphosphite and 255 g (1.29 moles) ethylene glycol dimethacrylate, 43.5 g (0.377 moles) tetramethylguanidine was added dropwise over 1 hour at ambient temperature. After the addition, the reaction was maintained at room temperature for 2 hours followed by 4 hours at 30° C. The reaction mixture was then heated to 45° C. over 3 hours and maintained at this temperature for 5 hours. Subsequently, volatiles (amine and excess diethylphosphite) were stripped under reduced pressure. Residual amine was then removed by treatment with acidic clay. The yield of Flame Retardant Compound B was 95%.

Example 3

TGA measurements were conducted upon Flame Retardant Compounds CB, CD, CE, A and B, supra, under nitrogen with a 10° C./min ramp. The results of the TGA measurements are set forth in Table 1 below:

TABLE 1

| TGA Measurements | |
|---|---|
| Flame Retardant Compound | 5% weight loss temperature ° C. |
| CB | 110 |
| CD | 110 |
| CE | 112 |
| A | 166 |

As these data shown, each of Flame Retardant Compounds CB, CD and CE which are illustrative of compounds outside the scope of the invention are too volatile to pass the Cal. TB 117 tests described infra. However, Flame Retardant Compounds A and B illustrative of compounds within the scope of the invention exhibit sufficiently low levels of volatility that make them useful for addition to flexible polyurethane foams that will pass the Cal. TB 117 tests.

Examples 4-9

Flexible polyurethane foams were prepared with each of Flame Retardant Compounds A-D and tested for scorch. The components of the flexible polyurethane foam-forming compositions and their amounts are set forth in Table 2 below:

TABLE 2

Flexible Polyurethane Foam-Forming Compositions Evaluated in the Scorch Test

| | Example | | | | | |
|---|---|---|---|---|---|---|
| | 4 | 5 | 6 | 7 | 9 | 9 |
| Polyether polyol | 100 | 100 | 100 | 100 | 100 | 100 |
| DABCO ® 33LV/A-1 amine catalyst | 0.22 | 0 | 0 | 0 | — | — |
| Water (blowing agent) | 5.0 | 5.0 | 5.0 | 5.0 | 5.0 | 5.0 |
| L 620 silicone stabilizer | 1.0 | 1.0 | 1.0 | 1.0 | 1.0 | 1.0 |
| Stannous octoate catalyst | 0.3 | 0.3 | 0.3 | 0.3 | 0.3 | 0.3 |
| Toluene diisocyanate (TDI) | 60 | 60 | 60 | 60 | 60 | 60 |
| NCO index | 110 | 110 | 110 | 110 | 110 | 110 |
| Flame Retardant Compound CA | 18 | 0 | 0 | 0 | 0 | 0 |
| Flame Retardant Compound CB | 0 | 0 | 0 | 0 | 18 | 0 |
| Flame Retardant Compound CD | 0 | 0 | 0 | 0 | 0 | 18 |
| Flame Retardant Compound B | 0 | 19 | 0 | 0 | 0 | 0 |
| Flame Retardant Compound A | 0 | 0 | 18 | 0 | 0 | 0 |
| Flame Retardant Compound B | 0 | 0 | 0 | 18 | 0 | 0 |

The polyol, flame retardant, water, amine catalyst and silicone stabilizer were mixed, with stirring, in a first beaker. In a separate beaker, the toluene diisocyanate (TDI) was weighed out. A cardboard box measuring 8"×8"×5" was assembled and the organotin catalyst was placed in a syringe. The first beaker was stirred at 2100 revolutions per minute for a period of 30 seconds and then the organotin catalyst was dosed thereto while stirring continued. After a total of 40 seconds of stirring, the TDI was added to the mixture. Stirring was then continued for an additional 7 seconds and the still-fluid mixture was quickly poured into the cardboard box. Cream times and rise time were recorded. At the completion of rise, a thermocouple was inserted into the middle of the resulting bun. When the internal temperature reached 150° C., the thermocouple was removed and the foam placed in a microwave oven for 2 minutes and ten seconds at 50% power. This setting was used for comparison purposes only. After its removal from the oven the foam was allowed to cure at ambient temperature overnight. The foam bun was then sliced in the center perpendicular to the direction of rise and examined for evidence of scorch.

Scorch is typically observed as a discoloration at the center of the interior of the foam. Scorch resistance is determined by measuring (or visually comparing) the color difference between the scorched and unscorched sections of the foam. Foams with a noticeable discoloration (rating 2 or above) are usually considered not scorch resistant.

Visual scorch ratings were made according to a scale of 1 to 4 as follows:

| Visual Scorch Rating | Appearance |
|---|---|
| 1 | no difference |
| 2 | small, but noticeable, discoloration |
| 3 | strong, very noticeable, discoloration |
| 4 | severe discoloration on most of the surface |

The results of the scorch test are presented in Table 3 below:

TABLE 3

Results of the Scorch Test

| Example | Visual Scorch Rating |
|---|---|
| 4 | 4.0 |
| 5 | 1.5 |
| 6 | 1.5 |
| 7 | 1.5 |
| 8 | 3.0 |
| 9 | 1.5 |

As the results of the scorch test show, Flame Retardants CA and CB failed the test. Each of Flame Retardants CD, CE, A and B performed satisfactorily in the test.

Examples 10-15

Flexible polyurethane foams were prepared with each of Flame Retardant Compounds CE, A and B and evaluated for flammability employing several test procedures as hereinafter described. Flame retardant CA and CB were not evaluated for flammability since they had failed the scorch test. Flame Retardant Compound CD failed the initial Ca. TB 117 screening test and was not evaluated in detail.

The flammability data for flame retardants CE, A and B were obtained with typical polyether-based flexible polyurethane foams that were tested at nominal densities of 1.0 and 1.8 pounds per cubic foot (pcf). The components of the flexible polyurethane foam-forming compositions and their amounts are set forth in Table 4 below:

TABLE 4

Flexible Polyurethane Foam-Forming Compositions Evaluated in the Flammability Tests

| | Example | | | | | | Foam air flow | Foam density |
|---|---|---|---|---|---|---|---|---|
| | 10 | 11 | 12 | 13 | 14 | 15 | (f³/min) | (pcf) |
| Polyether polyol | 100 | 100 | 100 | 100 | 100 | 100 | | |
| DABCO ® 33LV/A-1 amine catalyst | 0.23 | 0.23 | 0.23 | 0.23 | 0.24 | 0.25 | | |

TABLE 4-continued

Flexible Polyurethane Foam-Forming Compositions Evaluated in the Flammability Tests

| | Example | | | | | | Foam air flow (f³/min) | Foam density (pcf) |
|---|---|---|---|---|---|---|---|---|
| | 10 | 11 | 12 | 13 | 14 | 15 | | |
| Methylene chloride (blowing agent) | 8 | 8 | 8 | 8 | — | — | | |
| Water (blowing agent) | 5.6 | 5.6 | 5.6 | 5.6 | 3.55 | 3.55 | | |
| L 620 silicone stabilizer | 1 | 1 | 1 | 1 | 0.8 | 0.8 | | |
| Stannous octoate catalyst | 0.45 | 0.40 | 0.45 | 0.45 | 0.36 | 0.35 | | |
| Toluene diisocyanate (TDI) | 71 | 71 | 71 | 71 | 47.3 | 47.3 | | |
| NCO index | 110 | 110 | 110 | 110 | 110 | 110 | | |
| Flame Retardant Compound CE | 18 | 0 | 0 | | | | 6.6 | 1.10 |
| Flame Retardant Compound A | 0 | 18 | 0 | | | | 3.4 | 1.17 |
| Flame Retardant Compound B | 0 | 0 | 18 | | | | 5.5 | 1.04 |
| Flame Retardant Compound B | | | | 16 | | | 5.8 | 1.0 |
| Flame Retardant Compound B | | | | | 8 | | 3.0 | 1.76 |
| Flame Retardant Compound B | | | | | | 6 | 4.0 | 1.82 |

The polyol, flame retardant, methylene chloride (for 1 pcf density), water, amine catalyst and stabilizer were mixed, with stirring, in a first beaker. In a separate beaker, the toluene diisocyanate (TDI) was weighed out. A cardboard box for the foam measuring 16"×16"×5.5" was assembled and the organotin catalyst was placed in a syringe. The first beaker was stirred at 2100 revolutions per minute for a period of 35 second and then the organotin catalyst was dosed thereto while stirring was continued. After a total of 45 seconds of stirring, the TDI was added to the mixture. Stirring was then continued for an additional 7 seconds and the still-fluid mixture was quickly poured into the box. Cream time and rise time were recorded. Once the foam ceased to rise, it was allowed to cure for 2-3 hours under heating lamps and then overnight at ambient temperature.

The following standard flammability tests were employed.

Cal. TB 117 A Test: This test is a small-scale vertical test with a twelve-second-ignition time. The sample size was 12"×3×½". Two sets of samples were evaluated: samples conditioned at ambient temperature for 24 hours, Cal. TB 117 Test, initial) and samples that were also aged in the oven at 104° C. for 24 hours, Cal. TB 117 Test, aged). The ignition source was removed after twelve seconds. A second clock is started if the sample continues to burn. The criteria for failing included: a sample exceeding an individual burn of eight inches or an average burn of six inches. The time criteria required that an individual specimen would not have an individual afterflame or afterglow exceeding ten seconds or an average afterflame or afterglow exceeding five seconds.

Cal. TB 117 D Test: This test is a smoldering test in which a cigarette is used as the ignition source under a cotton cloth cover. The foam sample was covered with a standard velvet cotton cloth and was placed in a small wooden frame to form a mock chair. The back of the sample was 8"×7"×2", and the seat was 8"×4"×2". The sample was preweighed before testing and was again weighed after the test was finished. If the foam lost more than 20% of its weight, it was judged to be a failure.

MVSS 302 Test: This test is a horizontal flame test that is used as a guideline for automobile manufacturers. The sample size was 14"×4"×½". There is a line 1½" from the ignition point. A flame was ignited for fifteen seconds. The ignition source was then turned off and the sample was rated. A rating of "SE" indicates that the sample ignited but did not burn to the timing zone, which is a point starting from the 1½" mark to the 3½" line. A rating of "SENBR" indicates that the sample burned past the 1½" line but was extinguished before the 3½" mark. In this evaluation, a minimum performance of SENBR is required to pass the test.

The results of the flammability test are presented in Table 5 below:

TABLE 5

Results of the Flammability Test

| Example | Flame Retardant Compound | Cal. TB 117 Test, initial Inches/second | Cal. TB 117 Test, aged Inches/second | Cal. TB 117D Test, weight percent retention | MVSS 302 Test |
|---|---|---|---|---|---|
| 10 | CE | 3.2"/0' | Failed | — | — |
| 11 | A | 2.9"/0" | 3.6"/0.8" | — | — |
| 12 | B | 3.6"/0.4" | 3.9"/0.6" | 98.3 | — |
| 13 | B | 2.8"/0" | 3.9"/0" | 99.7 | — |
| 14 | B | 2.8"/0" | 2.5"/0" | 94.8 | SE |
| 15 | B | 4.8"/0" | 4.6"/3.1" | 91.2 | SENBR |

As these data show, flexible polyurethane foams containing phosphonates of acceptably low volatility (Flame Retardant Compounds A and B) passed both the Cal. TB 117 initial and aged flammability tests. However, Flame Retardant Compound CE which, as indicated in Table 1, underwent a 5% weight loss at the relatively low temperature of 112° C. failed the Cal. TB 117 aged flammability test.

* * *

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to any particular embodiment disclosed as the best mode contemplated for carrying out the process of the invention but that the invention will include all embodiments falling within the scope of the appended claims.

What is claimed is:

1. A flexible polyurethane foam-forming composition which, under polyurethane foam-forming conditions, provides a flame-retardant flexible polyurethane foam, the composition comprising:

a) at least one polyol;

b) at least one polyisocyanate;

c) at least one blowing agent;

d) at least one catalyst for the polyurethane-forming reaction;

e) at least one halogen-free flame retardant phosphonate compound of the general formula

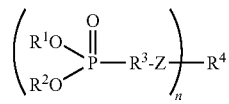

wherein $R^1$ and $R^2$ each independently is an alkyl, cycloalkyl, phenyl or alkyl-substituted phenyl group of up to about 8 carbon atoms or are joined together with their respective oxygen atoms and the phosphorus atom to form a heterocyclic ring having 6 ring members; $R^3$ is a straight or branched chain alkylene group of from 2 to 4 carbon atoms in the main chain; Z is —C(O)O—; $R^4$ is a hydrocarbon residue of from 2 to 4 carbon atoms and, n is 2.

2. The flexible polyurethane foam-forming composition of claim 1 wherein halogen-free flame retardant phosphonate compound (e) is at least one member of the group consisting of:

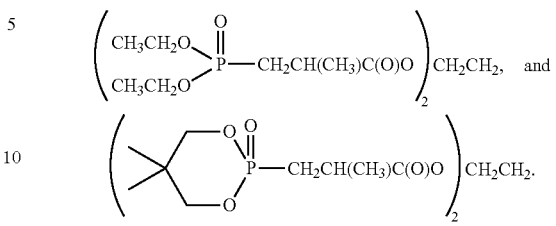

3. The flexible polyurethane foam-forming composition of claim 1 containing at least one other flame retardant additive.

4. The flexible polyurethane foam-forming composition of claim 3 wherein the other flame retardant additive is at least one compound selected from the group consisting of phosphate ester and phosphate-phosphonate.

5. The fire-retardant flexible polyurethane foam obtained from the flexible polyurethane foam-forming composition of claim 1.

6. The fire-retardant flexible polyurethane foam obtained from the flexible polyurethane foam-forming composition of claim 2.

7. The fire-retardant flexible polyurethane foam obtained from the flexible polyurethane foam-forming composition of claim 3.

8. The fire-retardant flexible polyurethane foam obtained from the flexible polyurethane foam-forming composition of claim 4.

* * * * *